United States Patent [19]
Dubois et al.

[11] 3,976,591
[45] Aug. 24, 1976

[54] NOVEL CHEMICAL SUBSTANCE PRESENTING A NEMATIC LIQUID PHASE

[75] Inventors: Jean Claude Dubois; Annie Zann; Jean Claude Lavenu, all of Paris, France

[73] Assignee: Thomson-CSF, Paris, France

[22] Filed: May 16, 1973

[21] Appl. No.: 360,894

[30] Foreign Application Priority Data
May 19, 1972   France .............................. 72.18032

[52] U.S. Cl. ............................. 252/299; 252/408; 260/473 R; 260/473 G; 260/476 R; 350/160 LC
[51] Int. Cl.² ........................ C09K 3/34; G02F 1/13
[58] Field of Search .......................... 252/408, 299; 350/160 LC; 260/476 R, 473 IG, 473 R

[56] References Cited
UNITED STATES PATENTS
| | | | |
|---|---|---|---|
| 3,772,210 | 11/1973 | Lodolini ...................... | 350/160 LC |
| 3,773,747 | 11/1973 | Steinstrasser ................ | 350/160 LC |
| 3,826,757 | 7/1974 | Wong .......................... | 350/160 LC |
| 3,876,286 | 4/1975 | Deutscher et al ............. | 252/299 |
| 3,925,482 | 12/1975 | Jacques ....................... | 252/299 |

FOREIGN PATENTS OR APPLICATIONS
| | | | |
|---|---|---|---|
| 2,123,175 | 12/1971 | Germany ................ | 252/299 |
| 2,024,269 | 12/1971 | Germany ................ | 252/299 |
| 2,139,628 | 2/1973 | Germany ................ | 252/408 |

OTHER PUBLICATIONS
Rondeau, R., et al., J. Amer. Chem. Soc., vol. 94, No. 4, pp. 1096–1102, (Feb. 23, 1972).

"Nematische p,p′–Disubstituierte Benzoesaurephenylester und Niedrig Schmelzende Eutektische Gemische," R. Steinstrasser, Z. Naturforsch, vol. 276, pp. 774–779, (July, 1972).

"Tolans Nematiques," J. Malthete, M. Leclercq, J. Gabard, J. Billard, and J. Jacques, C. R. Acad. Sci., (Paris), vol. 273, pp. 265–267, (1971).

Usol' Tseva et al., "Chemical Characteristics, Structure and Properties of Liquid Crystals," Russian Chem. Rev., vol. 32, No. 9, pp. 495–507, (1963).

*Primary Examiner*—Benjamin R. Padgett
*Assistant Examiner*—T. S. Gron
*Attorney, Agent, or Firm*—Oblon, Fisher, Spivak, McClelland & Maier

[57] ABSTRACT

A nematic liquid crystal of high stability, which can be utilized at normal temperatures, is obtained from compounds of the formula

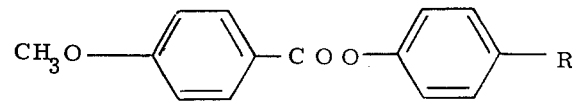

wherein R is an alkyl group having 1 to 14 carbon atoms, which present at least one nematic phase in the supper cooled liquid state. As a second embodiment, mixtures of the above compound with other nematic compounds formed nematic structures over wide temperature ranges.

2 Claims, No Drawings

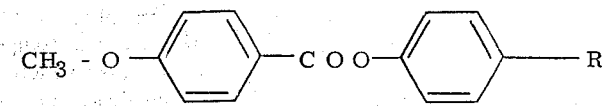

(I)

NOVEL CHEMICAL SUBSTANCE PRESENTING A NEMATIC LIQUID PHASE

BACKGROUND OF THE INVENTION

1. Field of the Invention

The present invention relates to nematic liquid crystals having advantageous properties which can be obtained from novel chemical substances.

2. Description of the Prior Art

It is well known that within the temperature range from the first melting point to the second melting point, also known as the clarification point, liquid crystals exist in a state of mesomorphism in which they are similar to solid crystals so far as their molecular arrangement and optical properties are concerned. In nematic systems, the elongated molecules have their axes parallel to each other, and their orientation can be controlled by an electric or magnetic field. This property forms the basis of the majority of their applications in the electro-optical and display fields.

Numerous chemical substances are known which will form liquid crystals. These liquid crystals will be more or less stable in terms of time depending upon the particular substance used in their formation. Among the known substances which provide high stability liquid crystals are the tolane derivatives of the formula:

wherein $R_1$ and $R_2$ signify organic radicals. These compounds suffer the disadvantage that they can only be used as liquid crystals within relatively narrow temperature ranges, which are often located far outside normal temperature ranges. Hence, their field of use has been narrowly limited.

A need continues to exist for a material capable of forming liquid crystals, which will provide a high degree of stability within normal temperature ranges.

SUMMARY OF THE INVENTION

Accordingly, it is one object of this invention to provide unique nematic liquid crystals which exhibit good stability at normal temperatures.

Another object of this invention is to provide nematic liquid crystals from novel chemical substances.

These and other objects as will hereinafter become more readily apparent have been attained by the preparation of nematic liquid crystals from a compound of the formula:

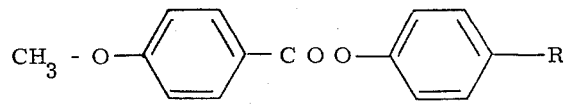

wherein R represents an alkyl group.

DETAILED DESCRIPTION OF THE INVENTION

According to this invention, nematic liquid crystals are prepared from wherein R is an alkyl group having 1–14 carbon atoms.

This compound can be prepared by the reaction of a p-benzoic acid chloride with an alkyl substituted p-phenol.

Compounds of this formula have now been discovered to exhibit a nematic phase within some temperature range during supercooling of a melt of the compound, or below the melt clarification point of the compound. The lowest point of the temperature range, of course, cannot be accurately defined since by definition supercooling is an unstable state in which a liquid is maintained at a temperature below the freezing point without the separation of solid matter. When the nematic phase occurs below the clarification point, but above the melting point, such as in the compound (I) when R is $C_5H_{11}$, the compound can be used alone for liquid crystal applications, since it will exhibit very good stability. The "clarification point" of course is that temperature at which the composition changes from its mesomorphic state into an isotropic state (normal liquid state).

When the nematic phase occurs only in the supercooled cooled state, such as occurs in the compound (I) wherein R is $C_3H_7$, $C_4H_9$ or $C_6H_{13}$, the liquid crystal can be used in combination with other liquid crystals and will be synergistically improved by extending the temperature range. This effect can be attained by admixing the compounds of this invention with each other, wherein one of the compounds mixed exhibits a nematic phase during the rise of temperature above the melting point, and another compound of the mixture exhibits the formation of a nematic phase only below the melting point. For instance, an equimolar mixture of compound (I) wherein R is the group $C_5H_{11}$ with compound (I) wherein R is the group $C_3H_7$, $C_4H_9$ or $C_6H_{13}$ in equimolar amounts will result in synergistically extending the temperature rise transformation range from 29° to 43° for $C_5H_{11}$ alone to −20° to 40°C for the admixture with $C_3H_7$ derivative, 19° to 30°C for $C_4H_9$ derivative.

The compounds (I) may also be admixed with such other conventional nematic liquid crystals as the tolane derivative of the formula

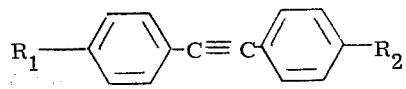

wherein $R_1$ and $R_2$ represent $C_nH_{2n+1}$—O—, $C_nH_{2n+1}$—COO—, $C_nH_{2n+1}$—, or $C_nH_{2n+1}$—O—COO—, wherein n is an integer of from 1 to 14. For instance the mixture of compound (I) wherein R is $C_5H_{11}$ with the tolane derivative: 4-heptanoate-4'-methoxytolane extends the temperature range to 25° to 58°C.

The compounds (I) may also be admixed with derivatives of the formula

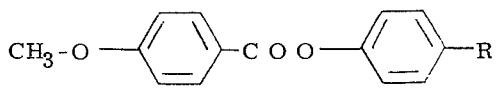

wherein R is an alkyl group as above defined. A mixture with this derivative is preferably in a molar ratio of 3 : 1, when R of compound (I) is C₅H₁₁.

The nematic liquid crystals of this invention can be used in a wide variety of applications including liquid crystal devices, and in particular conventional display and indicator devices.

Having now generally described the invention, a further understanding can be attained by reference to certain specific Examples which are provided herein for purposes of illustration only and are not intended to be construed as limiting of the invention, unless otherwise so specified.

EXAMPLE 1

Preparation of Compound I wherein R is $C_5H_{11}$.

First step (actual chemical reaction):

8.2 g of p-amylphenol and 8.5 g of p-methoxybenzoic acid chloride are dissolved successively in 65 ml of pyridine. The duration of the reaction is 24 hours at ambient temperature.

Second step (extraction of the product):

The solution is poured into a mixture of 30 ml of sulfuric acid and 300 g of ice. Shaking is carried out for a period of 1 hour. The product is extracted using ether. The product is then rinsed in hydrochloric acid (at normal concentration of 1 mole per liter) followed by rinsing in distilled water. Drying is carried out using sodium sulphate. The ether is filtered off and distillation carried out. In this way, the raw product is obtained.

Third step (purification of the product):

The product obtained is dissolved in hexane and filtered using silica. After distillation of the hexane, the product is then dissolved in hexane, and crystallized by cooling, this latter step being carried out three successive times. In this fashion, 8 g of p-amylpheno p-methoxybenzoate are obtained.

EXAMPLES 2 - 5

| Compound (I) | | Phase transformation during |
|---|---|---|
| Example | R | (a) : temperature rise |
| | | (b) : temperature drop (super cooling) |
| 2 | C₅H₁₁ | (a) : melting 29°, clarification 43° |
| | | (b) : nematic from 43° to −3° |
| 3 | C₃H₇ | (a) : melting and clarification 40° |
| | | (b) : nematic from 36° to 10° |
| 4 | C₄H₉ | (a) : melting and clarification 38° |
| | | (b) : nematic from 22° to −10° |
| 5 | C₆H₁₃ | (a) : melting and clarification 40° |
| | | (b) : nematic from 27° to 10° |

Only example 2 exhibits a nematic phase during the temperature rise (from 29° to 43°).

In the case of examples 3, 4 and 5, the nematic phase is obtained during super cooling of the chemical substances.

By the phrases "phase transformation during temperature rise and temperature drop", is meant the conditions under which the nematic crystal phase occurs during these conditions. In other words, in Examples 3–5, no nematic phase is obtained during temperature rise since the melt and clarification point both occur at the same temperature. In these Examples, however, the nematic crystal is formed during temperature drop within the temperature ranges indicated. In Example 2, however, the nematic phase occurs during both temperature rise and temperature drop. By temperature drop is meant that the nematic phase will occur if the temperature is reduced from 36° to 10° in Example 3 above for instance, but would not occur if the temperature is raised from 10° to 36°C.

Having now fully described the invention, it will be apparent to one of ordinary skill in the art that many changes and modifications can be made thereto without departing from the spirit or scope of the invention.

What is claimed as new and intended to be covered by Letters Patent is:

1. A nematic liquid crystal mixture, which comprises a mixture of an ester of the formula

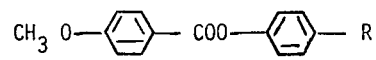

wherein R represents an alkyl group having 3, 5 or 6 carbon atoms in combination with a compound of the formula

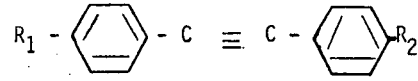

wherein $R_1$ and $R_2$ represent $C_nH_{2n+1}$—O, $C_nH_{2n+1}$—COO, $C_nH_{2n+1}$, or $C_nH_{2n+1}$—O—COO wherein $n$ is an integer of from 1 to 14.

2. The nematic liquid crystal mixture of claim 1 which comprises an ester of the formula:

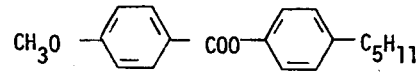

with a compound of the formula:

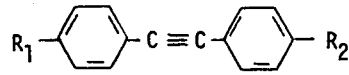

wherein $R_1$ and $R_2$ represent $C_nH_{2n+1}$—O, $C_nH_{2n+1}$—COO, $C_nH_{2n+1}$, or $C_nH_{2n+1}$—O—COO wherein $n$ is an integer from 1 to 14.

* * * * *